United States Patent [19]

Petit

[11] Patent Number: 4,953,078
[45] Date of Patent: Aug. 28, 1990

[54] APPARATUS AND METHOD FOR MULTI-THREADED PROGRAM EXECUTION IN A MICROCODED DATA PROCESSING SYSTEM

[75] Inventor: Phillip M. Petit, San Carlos, Calif.
[73] Assignee: Digital Equipment Corporation, Maynard, Mass.
[21] Appl. No.: 114,644
[22] Filed: Oct. 28, 1987
[51] Int. Cl.$^5$ ............................................. G06F 15/16
[52] U.S. Cl. .................................... 364/200; 364/900; 364/228; 364/243; 364/230.4; 364/931.4; 364/964
[58] Field of Search ... 364/200 MS File, 900 MS File

[56] References Cited

U.S. PATENT DOCUMENTS

| 4,079,455 | 3/1978 | Ozga | 364/200 |
| 4,131,941 | 12/1978 | Siegel et al. | 364/200 |
| 4,425,616 | 1/1984 | Woodell | 364/200 |
| 4,543,626 | 9/1985 | Bean et al. | 364/200 |
| 4,591,972 | 5/1986 | Guyer et al. | 364/200 |
| 4,591,982 | 5/1986 | Buonomo et al. | 364/200 |
| 4,745,544 | 5/1988 | Renner et al. | 364/200 |
| 4,754,393 | 6/1988 | Kitson et al. | 364/200 |

Primary Examiner—Gareth D. Shaw
Assistant Examiner—Gopal C. Ray
Attorney, Agent, or Firm—William W. Holloway; Michael A. Glenn

[57] ABSTRACT

In a microcoded central processing unit, apparatus and method are disclosed for permitting execution of a plurality of software programs, the secondary program being executed during no-op instructions for the primary program. The apparatus of the central processing unit is divided into two subunits capable of independent instruction execution for at least one timing cycle and referred to as master and slave portions. The memory unit storing the microcoded instruction word has two subunits, a subunit associated with the master portion and a subunit associated with the slave portion. Associated with each memory subunit is a microcode instruction word register that controls the operation of the associated portion of the central processing unit apparatus. Associated with each program is a microcode program counter that contains the address of the next instruction word in the program being executed. The master portion always executes from the primary program; while the slave portion executes either program under the control of a bit in the microcode instruction word associated with the master portion. This bit identifies that the next instruction in the primary instruction sequence is a no-op instruction with regard to the slave portion and indicates that the slave portion data processing apparatus is available for execution of a secondary program instruction during the primary program no-op instruction.

16 Claims, 3 Drawing Sheets

APPARATUS AND METHOD FOR MULTI-THREADED PROGRAM EXECUTION IN A MICROCODED DATA PROCESSING SYSTEM

BACKGROUND OF THE INVENTION

1. Field of the Invention

This invention relates generally to data processing systems and, more particularly, to microcoded data processing systems having at least one processing unit capable of independent operation for which no activity (no-op) instructions are typically provided.

2. Description of the Related Art

For many data processing applications, the use of a general purpose data processing system does not permit efficient execution of specialized programs. To increase the efficiency of program execution, it has become common to develop, for incorporation in the central processing unit, specialized processing units, such as co-processors for handling floating point and/or extended format arithmetic operations or, specialized processors with performance parameters optimized for manipulation of display information.

The activity of the specialized processor must be synchronized periodically with the activity of a general purpose microcoded central processing unit. However, the specialized processor can require more than one timing period for execution of the activity between the synchronization activity. Between the synchronization activity, the specialized processor executes procedures independently of the general purpose portion of the central processing unit. In the related art, a sequence of no-op (no operation or processor inactive) instructions are inserted in the instruction sequence to accommodate the period of time that the specialized processing unit is operating independently of the general purpose portion of the central processing unit. Typically, an instruction sequence (or instruction thread) is available for execution using general purpose portions of the central processing unit that are independent of the specialized processing unit. However, only a few (no-op) timing cycles are typically available for synchronization activities between the specialized processor and the general purpose central processing unit. The problem of how to integrate the plurality of instruction threads, where one of the threads must be executed in scattered groups of a few instructions, has eluded solution heretofore.

In the microcoded data processing system, one version of which is summarized by the block diagram of FIG. 1, an instruction 11 from a software program results in an address being entered in the program control register 12. The program control register 12 addresses a location in a memory unit 13 (typically a R(ead)O(nly)M(emory) unit. The signals from the addressed location are transferred to a microcode instruction register 14. The signals from the microcode instruction register 14 are applied to, and control, the apparatus performing the manipulation of data entities. The signals from the microcode instruction register 14 can determine the next instruction to be placed in the program control register, i.e., either from the software program instruction stream or from a predetermined (typically sequential) address in the memory unit 13. The implementation of a data processing system using microcode techniques has two advantages. First, the instruction set can be identical across a plurality of hardware implementations, the microcode circuitry serving as the interface mechanism. Second, complex sequences of activity can be initiated with a single software instruction, reducing the possibility of error in the formation of the software program.

The use of the microcoding techniques does not provide an obvious solution to the presence of sufficient apparatus in a central processing unit to execute independently two sequences of instructions. Indeed, the formal structure of the microcode sequences in the memory unit appear to provide a greater complication for independent execution of two instruction sequences even when one of the instruction sequences includes instructions referencing independently operating, specialized processors of the central processing unit and followed by no-op instructions with sufficient frequency to make the execution of a second instruction during the no-op instructions of the first instruction sequence attractive.

A need has therefore been felt for a technique that would permit simultaneous execution of two instruction sequences, in a central processing unit implemented with microcode techniques and having special purpose processing apparatus, without greatly increased complexity in the operation and with minimum additional apparatus.

FEATURES OF THE INVENTION

It is an object of the present invention to provide an improved data processing system.

It is a feature of the present invention to provide a technique for executing a plurality of instruction streams in a central processing unit implemented using microcode techniques.

It is yet another feature of the present invention to provide a microcoded central processing unit in which a first instruction sequence issues a relatively large number of no-op instructions during automatically executed activity and a second instruction sequence is executed during the no-op instructions.

It is another feature of the present invention to divide an instruction word into two portions, the two instruction word portions contained in different memory subunits, the two memory subunits being given the same address during execution of a non-no-op instruction by the primary instruction sequence, the two memory subunits being given different addresses during a no-op instruction of the primary instruction sequence.

SUMMARY OF THE INVENTION

The aforementioned and other features are accomplished, according to the present invention, by providing a microcode instruction word with two portions. A first portion of the microcode instruction word contains control signals for controlling a master portion of the circuitry. The second portion of the microcode instruction word includes control signals for controlling a slave portion of the circuitry. Each portion of the microcode instruction word has a memory subunit associated therewith. The slave portion of the microcode instruction word includes the address of the next microcode instruction word which can be the address of either the master and slave memory subunit location or can be the address only of a slave memory subunit location. The association of the addresses with either the master and slave memory subunit or the slave memory subunit alone is determined by a field in the master instruction portion. This field determines whether the primary instruction sequence will provide a no-op instruction on the next consecutive timing cycle. When a no-op instruction is provided in the primary instruction sequence, the master portion of the instruction word is accessed independently of the access of the slave instruction word portion, permitting execution of the secondary instruction sequence by the slave portion.

These and other features of the present invention will be understood upon reading of the following description along with the drawings.

DESCRIPTION OF THE PREFERRED EMBODIMENT

1. Detailed Description of the Figures

Figure 1:
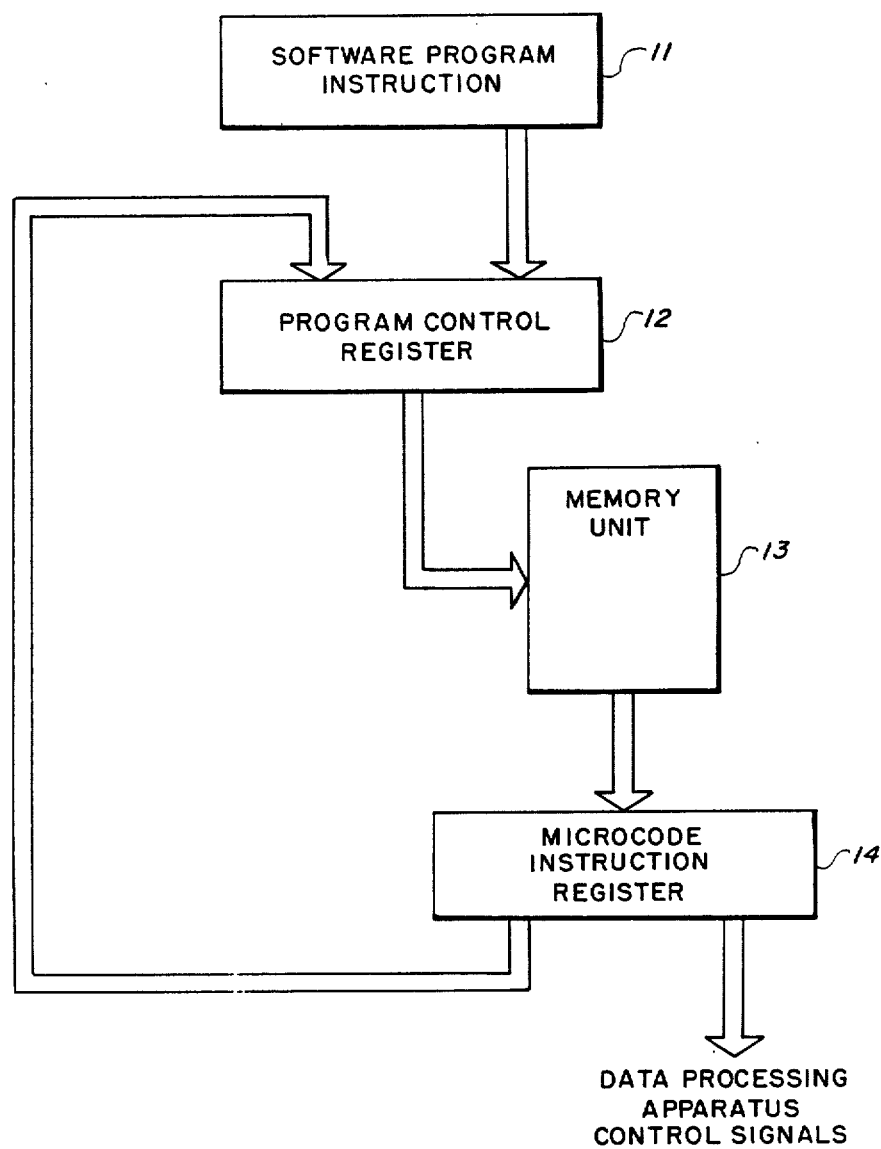
FIG. 1 is a block diagram of typical apparatus used in implementing microcoding techniques in a central processing unit.

FIG. 1 has been described with reference to the related art.

Figure 2:
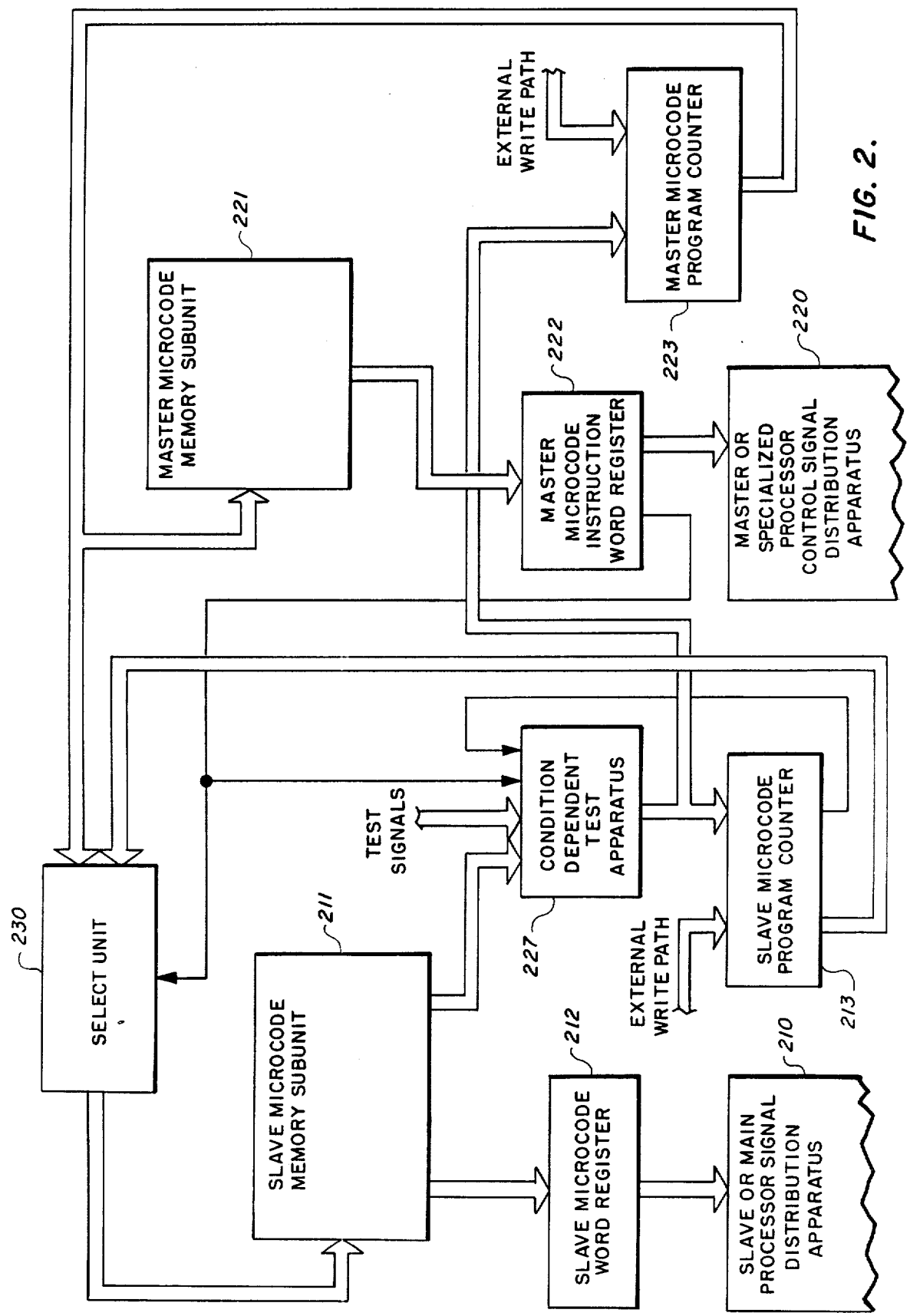
FIG. 2 is a block diagram of the apparatus in a microcoded central processing unit for executing two instruction sequences.

Referring now to FIG. 2, the apparatus used in executing two instruction streams or threads in a microcoded central processing unit is divided into two portions according to the preferred embodiment. The specialized processor control signal distribution apparatus for applying signals controlling the processing function of the special purpose processing unit 220 includes apparatus that, while operating under a microcode instruction applied during an earlier timing cycle, does not affect the operation of the remainder (i.e., general purpose portion) of the central processing unit. The slave or general processor control signal distribution apparatus 210 and the master or specialized processor control signal distribution apparatus 220 generally have overlapping apparatus, the distinction being, that during a no-op instruction, the slave control signal distribution apparatus 210 is not engaged in continuing activity. The slave control signal distribution apparatus 210 of the central processing unit receives control signals from the slave microcode instruction word register 212, while the master processor control signal distribution apparatus 220 of the central processing unit receives control signals from master microcode instruction word register 222. The contents of the master microcode instruction word register 222 are received from master microcode memory subunit 221 stored in an address determined by the master microcode program counter 223. The slave microcode instruction word register 212 receives its contents from a location in the slave microcode memory subunit 211 from an address determined by select unit 230. The select unit 230 receives address signals from slave microcode program counter 213 and from master microcode program counter 223 and transmits one of the two applied addresses in response to a signal from the master microcode instruction word register 222. The slave microcode program counter 213 and the master microcode program counter 223 have contents received from condition dependent test apparatus 227 which, in turn, receives its contents from an addressed location in the slave microcode memory subunit 211, conditionally modified as a result of the tested conditions. The program counters 213 and 223 can be loaded (by external write signals) from the central processing unit for initialization.

Figure 3:
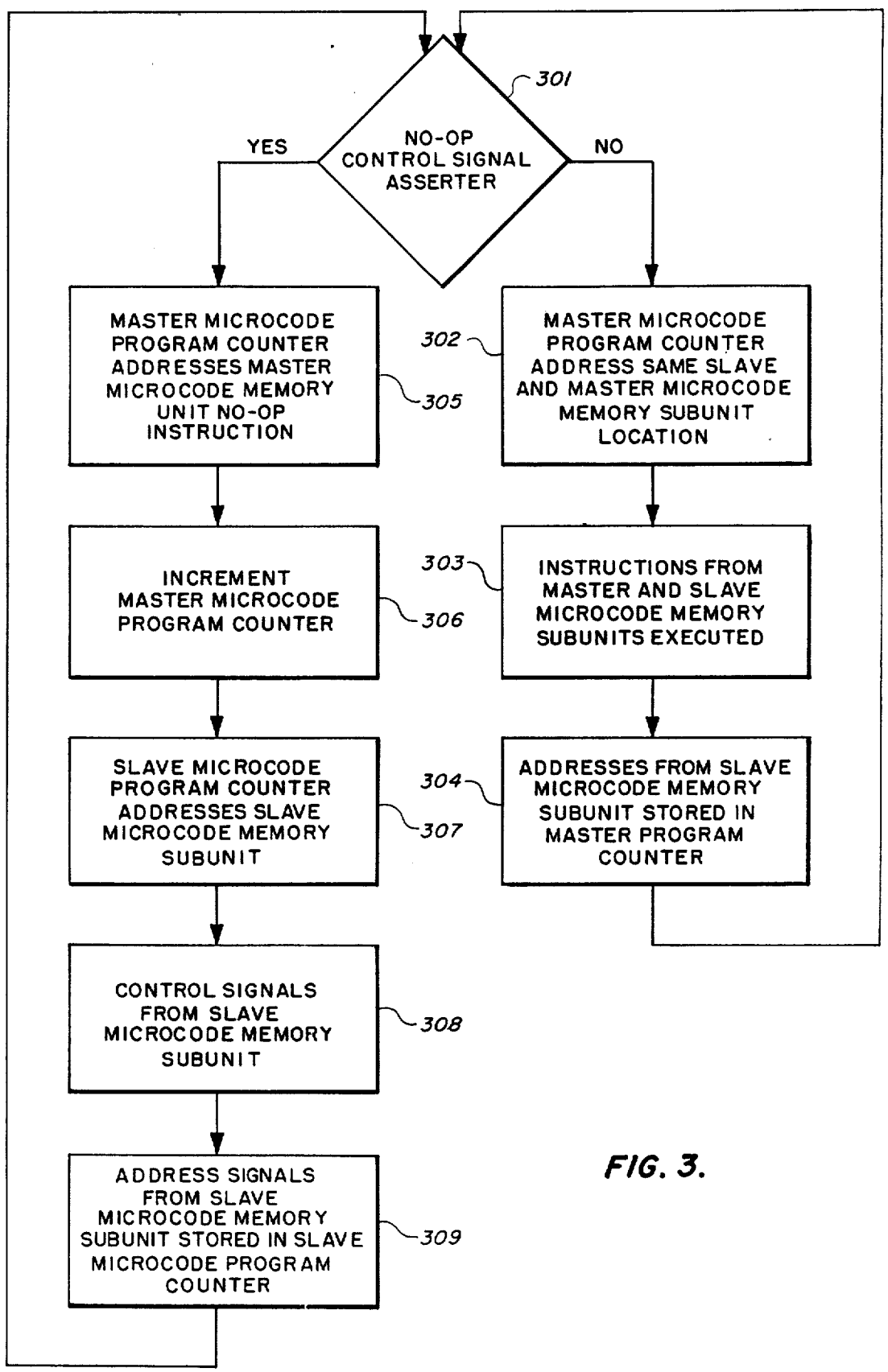
FIG. 3 is a flow diagram of microcode controller activity according to the present invention.

Referring next to FIG. 3, the operation of the apparatus of FIG. 2 is illustrated. In step 301, a test is made of the designated field in the master microcode instruction register 222 to determine if the no-op control signal is asserted. If the signal is not asserted, then in step 302, the address in the master microcode program counter 223 is used to address locations in both the master microcode memory subunit portion 221 and the slave microcode memory subunit portion 211. In step 303, the instruction addressed in step 302 is transferred to the master and slave microcode instruction word registers 212 and 222, the microcode instruction word registers generating control signals for controlling operation of the general processor and the specialized processor respectively while an address from the addressed location in the slave microcode memory subunit portion 211 is stored in master microcode program counter 223 in step 304. The process then returns to step 301. When the result of the test in step 301 is positive, the master microcode program counter 223 addresses a location in the master microcode memory subunit portion 221. At this location is an instruction which does not need the slave portion and which is transferred to the master microcode instruction word register 222. The master microcode program counter 223 is then incremented to address the next location in step 306. In step 307 (although simultaneous with step 305), the slave microcode program counter 213 addresses a location in the slave microcode memory subunit portion 211. The microcode instruction from the addressed location are transferred to the slave microcode instruction word register 212 and the control signals therefrom distributed to the slave processor in step 308. In step 309, address signals from the addressed location in the slave microcode memory subunit portion 211 are transferred to the slave microcode program counter 213.

2. Operation of the Preferred Embodiment

The central processing unit of the present invention is particularly well suited for applications in which specialized processing apparatus, performing generally routine but relatively continuous operations, must frequently interact with the general purpose processing apparatus of the central processing unit. The interaction can take the form of synchronization and/or updating of the specialized processing apparatus. Between the interactions of the specialized processing apparatus and the general purpose apparatus, the specialized apparatus can typically operate independently of and without using the resources of the general purpose processing apparatus. As an example, the continuous refreshing of an image display can be performed by specialized apparatus, while the updating of the image (involving the general purpose processing apparatus) is performed on a periodic or as required basis. The present invention uses those processor timing cycles when the general purpose processing apparatus is not required for manipulation of the signals representing image and is therefore available for program execution.

The technique for providing a multi-threaded microcode execution involves dividing the microcode instruction word into two portions, stored in separate ROMs in the preferred embodiment. One portion of the microcode instruction word is referred to as the master portion and is always addressed by a first or master program counter. The other portion of the instruction word can be addressed by either the master program counter or can be addressed by a second or slave program counter. The master portion of the microcode instruction word contains a bit position which controls which of the two program counters will be used for the slave portion of the microcode instruction word during the next cycle. The master portion of the instruction word includes fields which directly control the synchronous hardware. Therefore, the master portion of the microcode instruction word executes the program sequence or thread that controls the synchronous data processing apparatus. On those timing cycles when the microcode instruction word related to the primary or synchronous instruction sequence or instruction thread does not control any processing activity in the main/slave portion (i.e., a no-op instruction), a bit position from the master microcode instruction word register causes select unit 230 to apply the contents of the slave microcode program counter 213 to the slave microcode memory subunit 211, thereby executing a microcode instruction from the secondary sequence. The slave program counter is updated only during those timing cycles when a secondary instruction is to be executed. In the preferred embodiment, each microcode instruction word contains the address of the next instruction. That (next instruction) address is loaded only into one of the program counters, the program counter from which the microcode instruction word was retrieved. Thus, if a secondary microcode instruction word was retrieved using the slave program counter, the next address is loaded into the slave program counter. When the next instruction was retrieved using the master program counter (primary), the next address is loaded into the master program counter. In the case of a master microcode instruction word, the contents of the slave program counter is unchanged. In the case of a slave microcode instruction word, the master instruction sequence is still executing in order to remain synchronized, to control the synchronous apparatus, and to control the choice of program counters. Therefore, it is necessary to update the master microcode program counter to have the master portion of the master instruction word available. The update of the master microcode program counter is different from the update of the slave program counter so that the master instruction sequence will not be mixed with the slave instruction sequence. In the preferred embodiment, the master program counter is updated by incrementing (rather than having contents loaded therein) to insure that the two instruction streams remain isolated.

The present implementation can also accommodate instruction (slave) sequences that must be executed contiguously. For example, in some implementations, it is necessary that arithmetic tests must be performed on results obtained during the next previous instruction. The arithmetic operation and the arithmetic test must therefore be performed without an intervening instruction. With respect to the execution of the primary program, the control exerted by the master program sequence insures that the two requisite instructions will be performed consecutively. However, some mechanism must be provided to insure that the secondary program sequence is not interrupted by an instruction in the primary instruction sequence during the execution of two (or more) instructions that must be executed consecutively. Similarly, both instruction sequences must be able to use the central processing unit accumulator in the preferred embodiment. However, two instructions are required for use of the accumulator and these instructions must be executed without any intervening instruction (i.e., that might change the contents of the accumulator). In this situation as above, the secondary sequence of instructions must have a mechanism for guaranteeing that the two instruction groups will not be separated.

One solution to the problem of indivisible instruction groups is to provide a small field in the master instruction word that is testable by the other (slave) portion of the microcode instruction word. This field can be used by the primary instruction sequence to communicate to the secondary program sequence how many contiguous time intervals will be available following the present time interval. In the preferred embodiment, a two bit field is available in the master instruction word to indicate the available contiguous time intervals available for consecutive instruction execution. This field is tested in condition dependent test apparatus 227 which tests the number of no-op intervals available with the number required by the address located in the program counter. For example, when an arithmetic operation is to be performed and the result tested, a test of the master field is entered in the instruction. The instruction will then loop on itself until two contiguous intervals are available for secondary execution and then the secondary program jumps to the next (test) instruction. Similarly, in activity involving the accumulator, the slave instruction will loop on itself until contiguous time intervals are available.

As will be clear to those skilled in the art, the technique of the present invention can be extended to more than two instruction sequences. Additional apparatus needed to implement such a technique can involve apparatus for determining which of a plurality of slave programs is to be executed when the master program consists of no-op instructions or can provide for a hierarchy of slave programs that selects the highest priority slave program with a non-no-op instruction.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. An apparatus for providing control signals for a central processing unit implemented using microcode technology, said central processing unit including a first processor unit for executing a first portion of a first microcode instruction sequence and a second processor unit for executing either a second portion of said first microcode instruction sequence or a second microcode instruction sequence, said apparatus providing control signals to said first processor unit in response to a first portion instruction and providing control signals to said second processor unit in response to a second portion instruction or a second microcode instruction sequence instruction, said apparatus comprising:

a first instruction register;
first control means including a first program counter and a first memory subunit, wherein said first program counter applies a sequence of first addresses to said first memory subunit, each first address resulting in retrieval of a first portion instruction from said first memory subunit, each retrieved first portion instruction from said first memory subunit being stored in said first instruction register, output signals from said first instruction register providing said control signals to said first processor unit;

a second instruction register;

second control means including a second program counter and a second memory subunit, said second program counter providing second addresses for said second memory subunit, wherein an address applied to said second memory subunit results in a microcode instruction being stored in said second instruction register, said microcode instruction stored in said second instruction register providing said control signals to said second processor unit; and switch means having a first input for receiving a first address from said first program counter and having a second input for receiving a second address from said second program counter, an output address from said switch means being applied to said second memory subunit, said switch means responsive to a predetermined signal from said first instruction register for applying a second address from said second program counter to said second memory unit rather than a first address from said first program counter, said predetermined signal resulting in a second microcode sequence instruction being retrieved from said second memory subunit and stored in said second instruction register rather than retrieval and storage of a second portion instruction.

2. The apparatus of claim 1 wherein said predetermined signal causes an address from said second memory subunit to be stored in said second program counter, an address from said second memory subunit being stored in said first program counter when said predetermined signal is not present.

3. The apparatus of claim 2 wherein said predetermined signal designates that a next second portion instruction in said first microcode instruction sequence is a no operation instruction.

4. The apparatus of claim 1 wherein said predetermined signal identifies a no activity second portion instruction for said second processor unit in said first microcode instruction sequence, said apparatus causing at least one instruction from said second instruction sequence to be entered in said second instruction register in place of said no activity instruction.

5. The apparatus of claim 4 wherein said first processor unit is a specialized processing apparatus for performing specialized processing functions; and wherein said second processor unit is a general purpose processing apparatus for performing general processing operations and for performing specialized processing operations synchronized with specialized processing operations of said specialized processing apparatus, wherein said general purpose processing apparatus can execute said second instruction sequence when synchronized instruction processing is not required.

6. The apparatus of claim 5 wherein a signal group from said first instruction register identifies a number of consecutive no activity second portion instructions for said second processor unit following said signal group, said signal group causing said number of second sequence microcode instructions to be entered sequentially in said second instruction register in place of said no activity second portion instructions.

7. In a central processing unit implemented using microcode techniques and having a special purpose processing unit and general purpose processing unit, said special purpose processing unit and said general purpose processing unit capable of independent processing activity, a method of simultaneously executing a first and a second microcode instruction sequence, said first microcode instruction sequence controlling processing of said special purpose and said general purpose processing units, said second microcode instruction sequence controlling processing of said general purpose processing unit, said method comprising the steps of:

retrieving a first portion of a first microcode instruction sequence instruction from a first memory unit at an address determined by a first program counter and storing said retrieved first instruction portion in a first instruction register controlling operation of said special purpose processing unit;

when a predetermined signal is not present in a current instruction in said first instruction register, retrieving a second portion of said first microcode instruction sequence instruction in a second memory unit at an address determined by said first program counter and storing said retrieved first instruction microcode sequence second portion in a second instruction register controlling operation of said general purpose processing unit;

when said predetermined signal is present in said current instruction in said first instruction register, retrieving a first instruction of said second microcode instruction sequence at an address in said second memory unit determined by a second program counter and storing said retrieved second instruction sequence first instruction in said second instruction register.

8. The method of claim 7 further comprising the steps of:

storing address signals from a second memory location in said first program counter when said second memory unit is addressed by said first program counter; and storing address signals from said second memory location in said second program counter when said second memory unit is addressed by said second program counter.

9. The method of claim 8 further comprising the step of:

incrementing said first program counter when said second program counter addresses said second memory unit.

10. The method of claim 7 further comprising the step of:

identifying by means of logic apparatus responsive to said predetermined signal when a next first microcode instruction sequence instruction requires processing by said general purpose processing unit, said logic apparatus determining which program counter addresses said second memory unit.

11. The method of claim 7 further comprising the step of:

identifying by means of logic apparatus responsive to a signal group from said first instruction register a number of consecutive first microcode instruction sequence instructions following said current microcode instruction sequence instruction not requiring processing by said general purpose processing unit, said logic means determining which program counter addresses said second memory for said number of consecutive first microcode instruction sequence instructions.

12. In a central processing unit implemented using microcode techniques, said central processing unit having a special purpose processing unit for performing special processing operations and a general purpose processing unit for performing general purpose processing operations, said special purpose processing unit and said general purpose processing unit capable of independent operation, said central processing unit including control apparatus for simultaneous execution of a first instruction sequence controlling said special purpose and said general purpose processing units and a second instruction sequence controlling said general purpose processing unit, said control apparatus comprising:

- a first memory subunit storing first microcode instructions of said first instruction sequence for controlling said special purpose processing unit;
- a first program counter for addressing said first memory subunit;
- a first instruction register for receiving a first microcode instruction from said first memory subunit from a location addressed by said first program counter, said first instruction register applying control signals to said special purpose processing unit;
- a second memory subunit storing second microcode instructions of said first instruction sequence and said second instruction sequence for controlling said general purpose processing unit and storing a next address;
- a second program counter for addressing said second memory subunit;
- a second instruction register for receiving second microcode instructions from said second memory subunit, said second instruction register applying control signals to said general purpose processing unit; and selection means having addresses from said first program counter and from said second program counter applied thereto, said selection means responsive to a predetermined signal from said first instruction register for determining when said first program counter addresses said second memory subunit and when said second program counter addresses said second memory subunit, a microcode instruction at an addressed location being stored in said second instruction register, wherein said first program counter addresses a second memory subunit location storing a second microcode instruction and said second program counter addresses a second memory subunit location storing a second instruction sequence instruction.

13. The control apparatus of claim 12 wherein said next address in a location in said second memory subunit addressed by said first instruction counter is stored in said first program counter.

14. The control apparatus of claim 13 wherein said predetermined signal from said first instruction register indicates when a next second microcode instruction of said first instruction sequence is a no operation instruction.

15. The control apparatus of claim 13 wherein said selection means is responsive to a signal group from said first instruction register indicating a presence of an identified number of consecutive no operation second microcode instructions in said first instruction sequence that follow a current microcode instruction in said first instruction register, said signal group controlling addressing of said first and said second memory subunits by said first and said second instruction counters for said identified number of microcode instructions.

16. The control apparatus of claim 13 wherein a next address in a location in said second memory subunit addressed by said second program counter is stored in said second program counter.

* * * * *